United States Patent
Langner et al.

(10) Patent No.: US 11,055,244 B1
(45) Date of Patent: Jul. 6, 2021

(54) APPARATUS AND METHOD FOR SIMULTANEOUS BIDIRECTIONAL SERIAL LANES OVER USB-C INTERFACE

(71) Applicant: Aquantia Corporation, San Jose, CA (US)

(72) Inventors: Paul Langner, Fremont, CA (US); Simon Edelhaus, San Ramon, CA (US)

(73) Assignee: Marvell Asia Pte, LTD., Singapore (SG)

(*) Notice: Subject to any disclaimer, the term of this patent is extended or adjusted under 35 U.S.C. 154(b) by 90 days.

(21) Appl. No.: 16/419,585

(22) Filed: May 22, 2019

Related U.S. Application Data

(60) Provisional application No. 62/688,525, filed on Jun. 22, 2018.

(51) Int. Cl.
G06F 13/38 (2006.01)
G06F 13/42 (2006.01)

(52) U.S. Cl.
CPC ........ G06F 13/385 (2013.01); G06F 13/4282 (2013.01); *G06F 2213/0042* (2013.01)

(58) Field of Classification Search
CPC ............... G06F 13/385; G06F 13/4282; G06F 2213/0042
See application file for complete search history.

(56) References Cited

U.S. PATENT DOCUMENTS

| | | | | |
|---|---|---|---|---|
| 6,823,483 | B1* | 11/2004 | Creigh | G01R 31/3004 375/219 |
| 8,774,187 | B2* | 7/2014 | Hartman | H04L 49/602 370/392 |
| 10,073,806 | B2* | 9/2018 | Zhu | G06F 13/4282 |
| 2005/0198343 | A1* | 9/2005 | Yoshimura | H04L 67/06 709/231 |
| 2008/0261540 | A1* | 10/2008 | Rohani | H04B 1/406 455/77 |
| 2009/0175283 | A1* | 7/2009 | Jan | G06F 13/4045 370/401 |
| 2011/0026525 | A1* | 2/2011 | He | H04L 49/351 370/392 |
| 2012/0204002 | A1* | 8/2012 | Basso | H04L 69/12 712/30 |
| 2015/0339250 | A1* | 11/2015 | Yu | G06F 13/4022 710/14 |
| 2017/0357803 | A1* | 12/2017 | Amarilio | G06F 11/3055 |

* cited by examiner

*Primary Examiner* — Farley Abad

(57) ABSTRACT

An input/output (I/O) interface system for computing devices is disclosed. The I/O interface system includes an externally-engageable USB-C interface connector. A first I/O protocol controller circuit couples to the USB-C interface connector via multiple bidirectional serial lanes. Each of the bidirectional serial lanes transfers a single serial stream of data in a simultaneously bidirectional manner. A second I/O protocol controller circuit couples to the USB-C interface connector via multiple unidirectional serial lanes. Each of the unidirectional serial lanes transfers a single serial stream of data in a unidirectional manner. Mode control circuitry selects between the first I/O protocol controller circuit and the second I/O protocol controller circuit for data transfers with the USB-C interface connector based on a detected signaling media externally connected to the USB-C interface connector.

17 Claims, 4 Drawing Sheets

FIG. 3
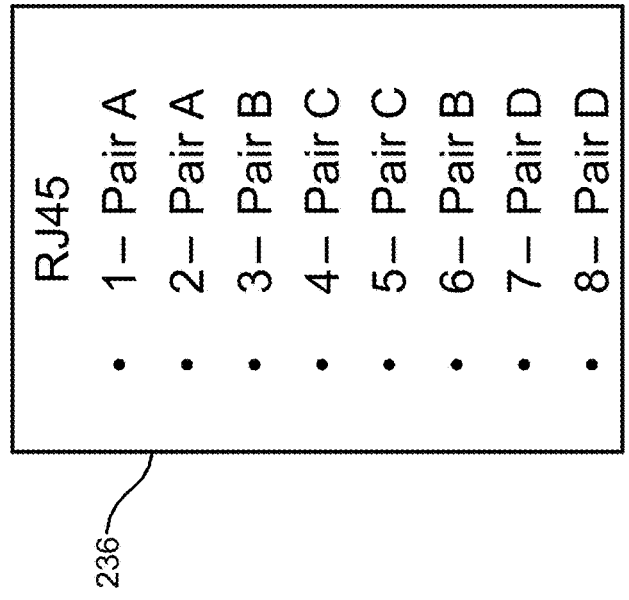
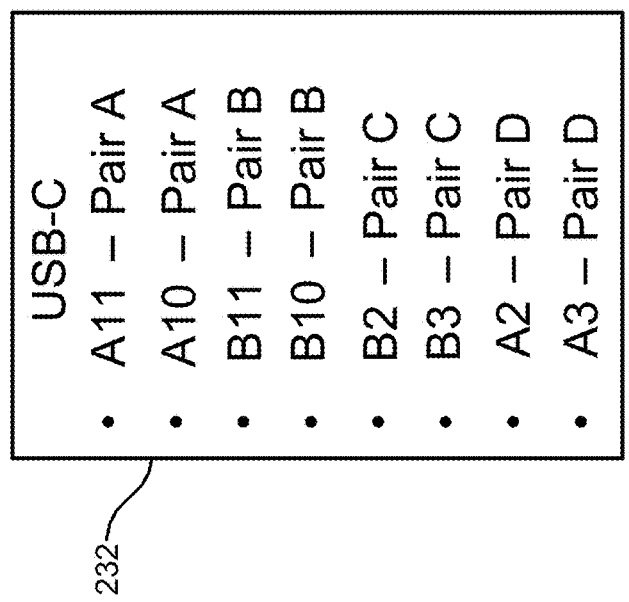
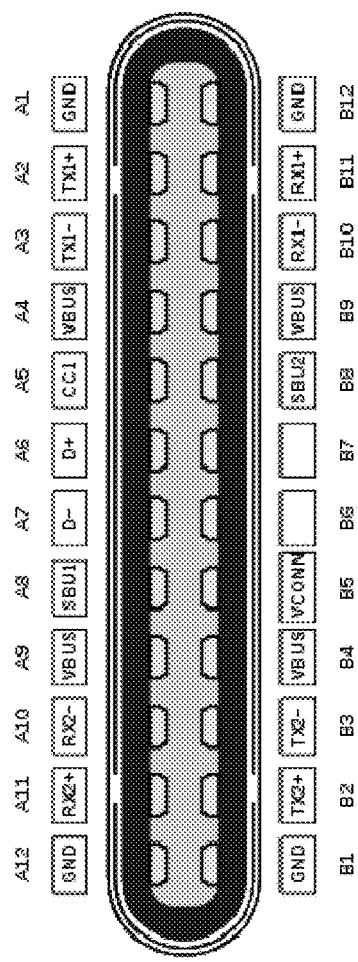

APPARATUS AND METHOD FOR SIMULTANEOUS BIDIRECTIONAL SERIAL LANES OVER USB-C INTERFACE

RELATED APPLICATION(S)

This application claims benefit of priority to Provisional U.S. Patent Application No. 62/688,525, titled "Apparatus and Method for Wired Ethernet Over USB-C Interface", filed Jun. 22, 2018, the aforementioned priority application being hereby incorporated by reference in its entirety.

TECHNICAL FIELD

The disclosure herein relates to communications systems, and more specifically to high-speed interface systems and methods.

BACKGROUND

Modern mobile devices, such as laptops, tablets and mobile phones, are increasingly adopting packaging constraints that prevent incorporation of specialized link interface connectors. As a result, external link connectivity is either achieved via wireless link protocols, or through a Universal Serial Bus (USB) port via an external adapter. Wireless connectivity may prove problematic in certain situations. A conventional external Ethernet-to-USB or Ethernet-to-Thunderbolt adapter is often bulky in that the active Ethernet electronics employed in the adapter typically need passive cooling structures to maintain consistent operation.

It would be desirable to utilize the USB-C interface on a computing device for transferring data with a wired link in accordance with multiple link protocols, including both unidirectional links and bidirectional links.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3 illustrates one embodiment of a pin mapping between a USB-C connector and an RJ45 Ethernet connector.

DETAILED DESCRIPTION

Methods and apparatus for input/output (I/O) systems are disclosed. In one embodiment, an input/output (I/O) interface system for computing devices is disclosed. The I/O interface system includes an externally-engageable USB-C interface connector. A first I/O protocol controller circuit couples to the USB-C interface connector via multiple bidirectional serial lanes. Each of the bidirectional serial lanes transfers a single serial stream of data in a simultaneously bidirectional manner. A second I/O protocol controller circuit couples to the USB-C interface connector via multiple unidirectional serial lanes. Each of the unidirectional serial lanes transfers a single serial stream of data in a unidirectional manner. Mode control circuitry selects between the first I/O protocol controller circuit and the second I/O protocol controller circuit for data transfers with the USB-C interface connector based on a detected signaling media externally connected to the USB-C interface connector.

Figure 1:
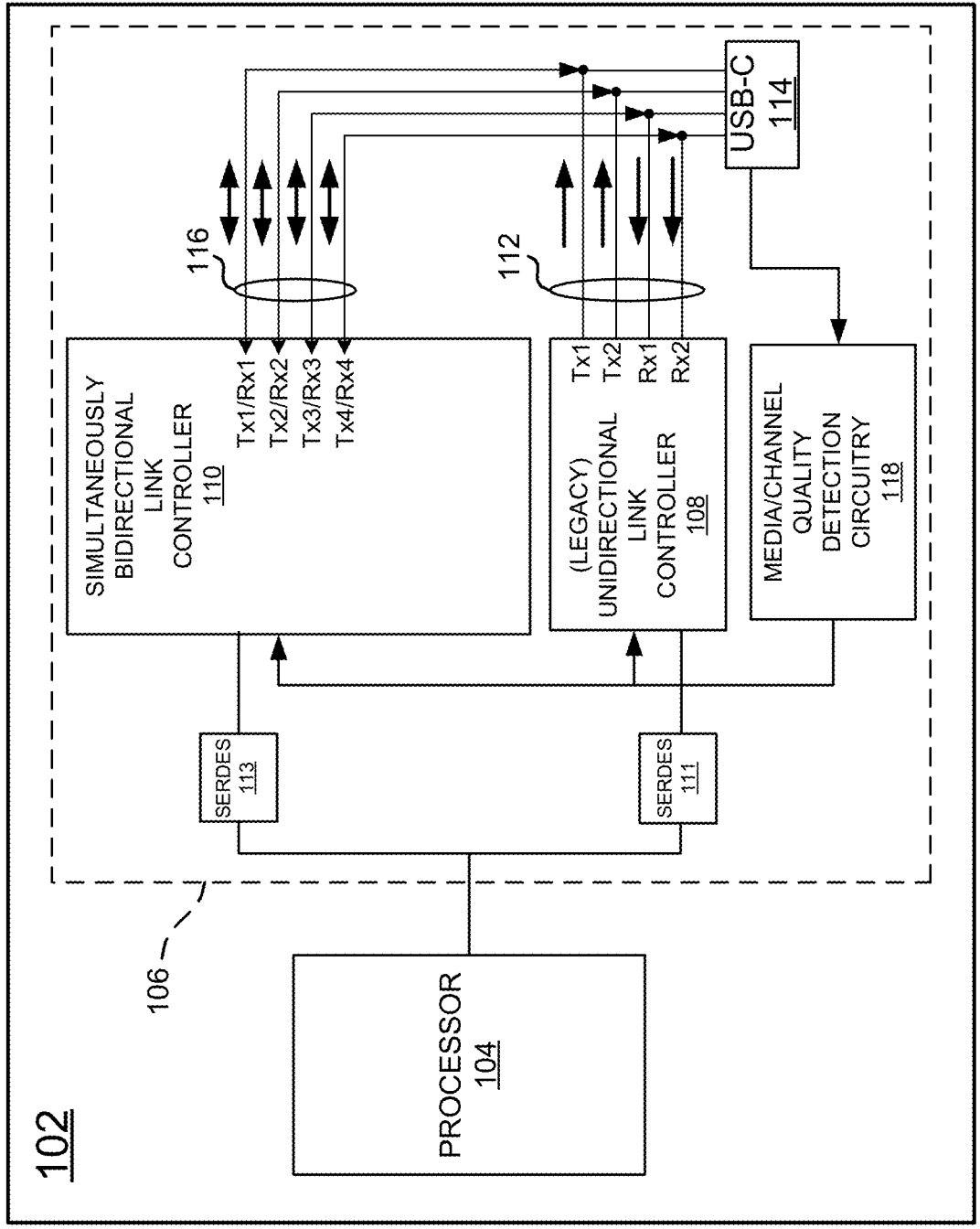
FIG. 1 illustrates one embodiment of an interface system that enables multi-protocol interface modes between a computing device and a wired data link.

FIG. 1 illustrates a high-level diagram of one embodiment of an input/output (I/O) interface system that may be employed in computing devices to enable high-speed data transfers between devices that may operate in accordance with different data transfer protocols, such as USB-C, Thunderbolt, and Dual Duplex. USB-C and Thunderbolt protocols generally transfer data along differential unidirectional signaling paths, while the Dual Duplex protocol involves data transfers along differential simultaneously bidirectional signaling paths. By reusing the same differential signaling lanes and interface connector for various interface protocols, including those that are bidirectional and those that are not, the existing signaling infrastructure of the computing device may be flexibly enhanced to provide significantly higher bandwidth as technology improves.

Further referring to FIG. 1, one embodiment of a computing device, generally designated 102, employs a general purpose processor 104 that transfers data with a multi-protocol interface system 106. The interface system includes a legacy unidirectional link controller 108 and a simultaneously bidirectional link controller 110. The legacy unidirectional link controller 108 couples to the processor via a first serializer/deserializer (SerDes) circuit 111, and provides a pair of unidirectional transmitters Tx1 and Tx2 to drive transmit signals along two differential signaling lanes. A pair of unidirectional receivers Rx1 and Rx2 receive data signals from a corresponding pair of differential receive lanes. The collection of unidirectional transmit and receive lanes forms a link 112 that terminates in appropriate pins of a Universal Serial Bus connector 114, such as one in accordance with the USB-C standard.

The legacy unidirectional link controller 108 may communicate with the USB-C connector 114 via one from a variety of unidirectional interface protocols. In one embodiment, data may be transferred along the lanes in accordance with a native USB-C interface protocol. In other embodiments, the unidirectional link controller may take the form of a Thunderbolt link controller, which also transfers data along differential lanes, with each lane transferring data unidirectionally, although in an aggregate manner.

With further reference to FIG. 1, the simultaneously bidirectional link controller 110 couples to the processor 104 via a second SerDes circuit 113, and includes transceiver circuitry with multiple transceivers Tx1/Rx1-Tx4/Rx4 that couple to respective differential pair terminations of the USB-C connector 114. Each of the transceivers is configured to simultaneously transmit and receive data over a single differential pair, or lane. The collection of lanes forms a bidirectional link 116. As a result, data transfer bandwidth via the USB-C interface connector may be significantly increased without the need for a different connector. As described below, various simultaneously bidirectional signaling schemes may be employed or controlled by the bidirectional link controller, such as high-speed NBASE-T Ethernet or Dual Duplex.

For one embodiment, the interface system 106 employs a media/channel quality detection circuit 118. The detection circuit provides feedback from the USB-C connector 114 to the unidirectional and bidirectional link controllers 108 and 110. A selection between use of the unidirectional link controller or the bidirectional link controller may be made based on the type of media connected to the USB-C connector, and/or based on a detected signal quality affecting signals received from the link.

Figure 2:
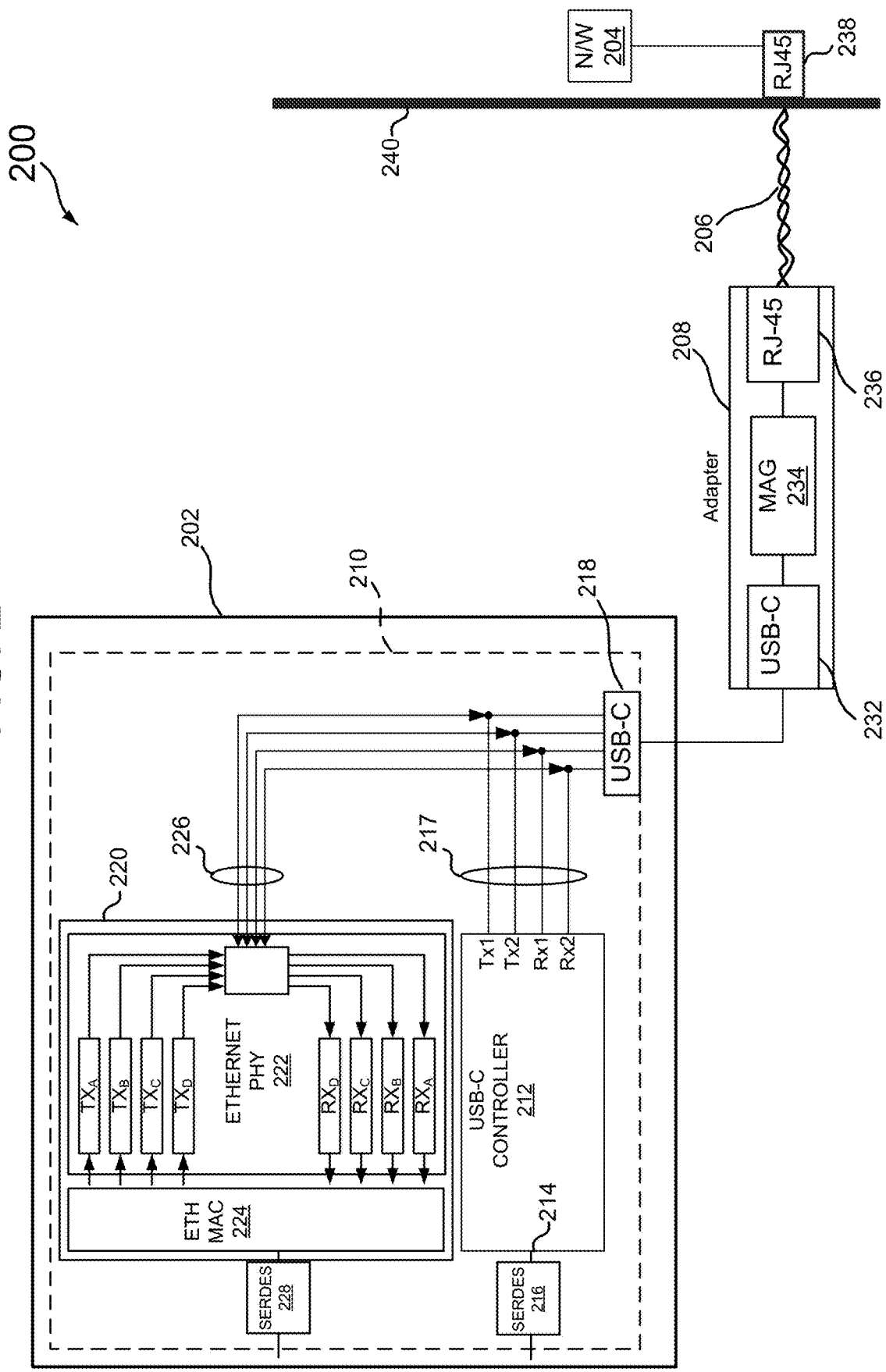
FIG. 2 illustrates one embodiment of a computing device interfaced with Ethernet-Over-USB-C connector capability.

Referring now to FIG. 2, one embodiment of the interface system of FIG. 1 employs an Ethernet controller as a simultaneously bidirectional link controller in a mobile network, generally designated 200. One specific embodiment for the mobile network includes a mobile computing device 202 that interfaces with an externally-accessible Ethernet network 204, via externally supplied media such as a cable 206, and a passive adaptor 208. The passive adaptor provides a conversion between signals routed via the USB-C interface and the Ethernet interface with passive circuitry and minimal power dissipation such that the mobile device is able to directly access the Ethernet network via a convenient wired connection.

Further referring to FIG. 2, the mobile device 202 may take the form of a mobile computing device such as a laptop, tablet, or telephone. For one embodiment, the mobile device employs a wired communication interface 210 that generally meets and/or exceeds standardized features associated with the Universal Serial Bus USB-C standard. The USB-C interface 210 includes a USB-C controller 212 that includes multiple transmit and receive ports Tx1, Tx2, Rx1, Rx2 at a line end, and a serial port 214 that couples to a SERDES circuit 216 opposite the line end. The multiple transmit and receive ports couple to corresponding data paths 217 that couple to a USB-C connector 218. In some embodiments, an interface associated with the Thunderbolt standard may be employed, where the Thunderbolt 3 interface employs the same port type as USB-C connector interface 218.

Further referring to FIG. 2, an Ethernet transceiver IC chip 220 is employed in the mobile computing device 202 to enable the mobile device to quickly access wired Ethernet networks without the use of a bulky adaptor. The Ethernet transceiver IC chip 220 includes a physical circuit PHY 222 and a media access control (MAC) circuit 224. The PHY 222 includes transmit and receive circuitry TXA-TXD, RXA-RXD for transceiving data across four simultaneously bidirectional channels or lanes that together form a link 226. Each of the four channels couples to one of the USB-C data paths 217 along very short stub-length paths. The MAC circuit 224 interfaces the PHY 222 to a general purpose processor (not shown) via a SERDES circuit 228. High-impedance capabilities via an MDI may also be provided.

For one embodiment, a direct Ethernet connection is provided via the Ethernet-over-USBC adapter 208. The adapter 208 generally includes an adapter USB-C interface 232, a magnetic circuit 234 coupled to the adaptor USB-C circuit, and an adapter Ethernet interface 236 that couples to multiple twisted-pair cables consistent with a high-speed Ethernet protocol such as, for example 10GBASE-T. Circuitry in the magnetic circuit 234 maps the pins of the various interfaces to allow for communication therebetween. For one embodiment, power-over-Ethernet capability may also be provided by including appropriate circuitry in the adaptor.

FIG. 3 illustrates further detail of one embodiment of the pin mapping between the adaptor USB-C interface 232 and the adaptor Ethernet interface 236. The RJ45 pin-outs correspond to four pairs of wires that are typically identified as Pair A, Pair B, Pair C, and Pair D. The adaptor USB-C interface, represented by the USB-C connector, may also have four pairs of wires available, corresponding to Pairs A-D. Since the Ethernet transceiver IC chip 120 is disposed in the mobile device 202, little to no cooling circuitry needs to be employed in the adaptor. This allows the adaptor to exhibit a small footprint with very little power consumption.

In operation, a user desiring to establish a wired Ethernet connection may connect the adapter 208 between a suitable USB-C port on the mobile device 202 and a standard RJ45 Ethernet jack, such as at 238, typically installed flush with a wall 240. Circuitry in the USB-C controller detects the adaptor connection and operates in accordance with an Ethernet mode, where data transfers are carried out across the USB-C interface port with the Ethernet transceiver chip.

Figure 4:
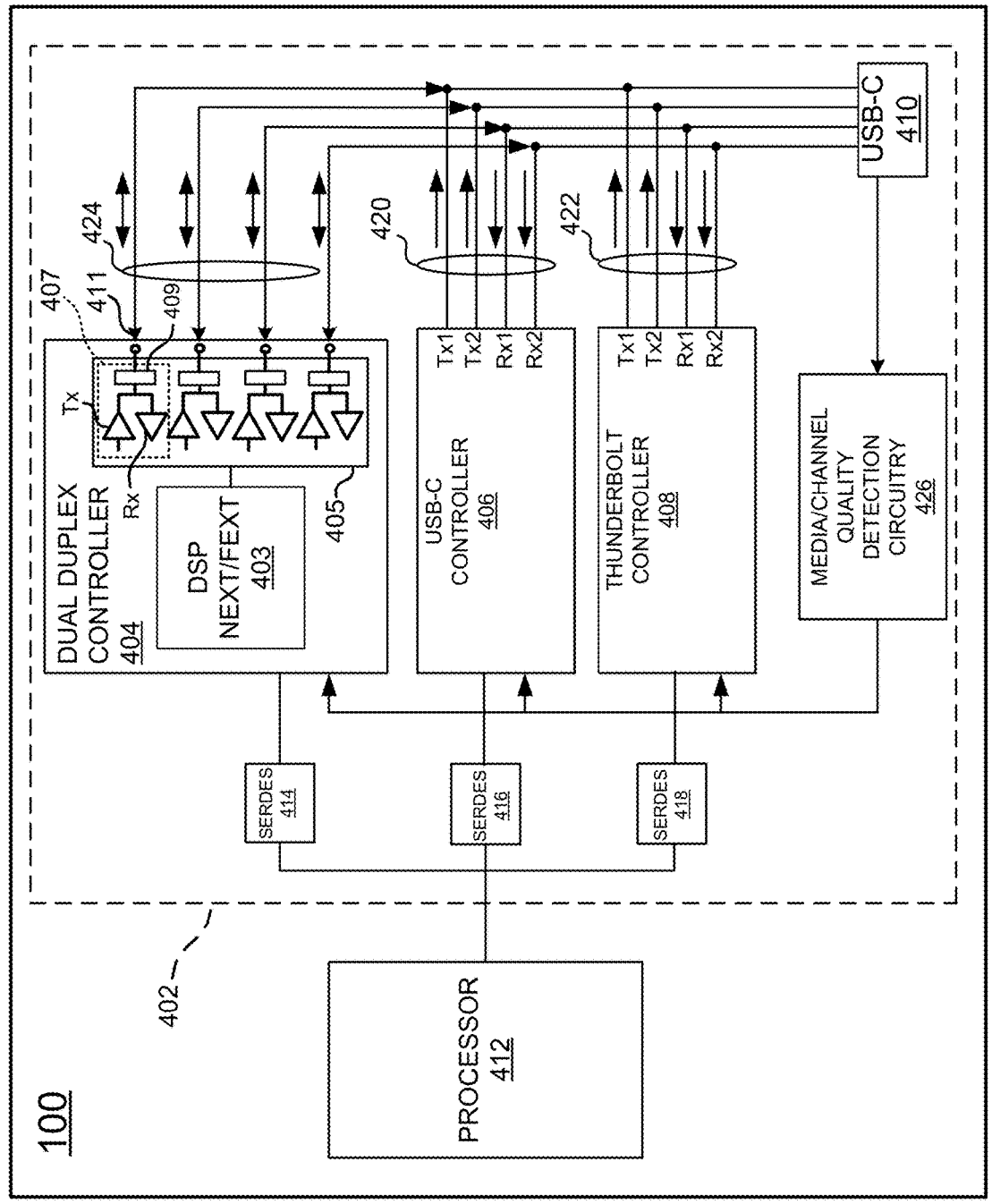
FIG. 4 illustrates a computing device that employs an interface system similar to that of FIG. 1.

In a further embodiment, FIG. 4 illustrates a computing device, generally designated 400, that employs an interface system 402 similar to that of FIG. 1. For the embodiment of FIG. 4, the simultaneous bidirectional link controller employed by the system of FIG. 1 may take the form of a Dual-Duplex controller 404, while additional unidirectional link controllers such as a USB-C controller 406 and a Thunderbolt controller 408 may also be utilized. All of the controllers interface with a USB-C connector 410 to provide maximum interface protocol flexibility while minimizing the connector footprint.

Further referring to FIG. 4, the computing device 400 includes a general purpose processor 412 that communicates with each of the various interface protocol controllers 404, 406 and 408 via corresponding SerDes circuits 414, 416 and 418. The USB-C unidirectional link controller 406 provides a pair of unidirectional transmitters Tx1 and Tx2 to drive transmit signals along two differential signaling lanes. A pair of unidirectional receivers Rx1 and Rx2 receive data signals from a corresponding pair of differential receive lanes. The collection of unidirectional transmit and receive lanes forms a link 420 that terminates in appropriate pins of the Universal Serial Bus connector 410, such as one in accordance with the USB-C standard.

With continued reference to FIG. 4, the Thunderbolt interface controller 408 provides a pair of unidirectional transmitters Tx1 and Tx2 to drive transmit signals along two differential signaling lanes. A pair of unidirectional receivers Rx1 and Rx2 receive data signals from a corresponding pair of differential receive lanes. The collection of unidirectional transmit and receive lanes forms a link 422 that terminates in appropriate pins of the Universal Serial Bus connector 410.

With further reference to FIG. 1, the Dual Duplex link controller 404 includes digital signal processing (DSP) circuitry 403 that employs digital filtering techniques capable of compensating for crosstalk and echo signaling effects. The Dual Duplex controller further includes transceiver circuitry 405 with multiple transceivers, such as at 407. Each transceiver includes a transmitter Tx, a receiver Rx, and a hybrid circuit 409 that couples to a separate differential pair signaling path, or lane, such as at 411. Each lane terminates in a respective differential pair termination of the USB-C connector 410. Each of the transceivers is configured to simultaneously transmit and receive data over a single differential pair, or lane. The collection of lanes forms a bidirectional link 424, where each individual lane forms a simultaneously bidirectional signaling path. As a result, data transfer bandwidth via the USB-C interface connector may be significantly increased without the need for a different connector.

For one embodiment, the interface system 402 employs a media/channel quality detection circuit 426. The detection circuit provides feedback from the USB-C connector 410 to the unidirectional and bidirectional link controllers 404, 406 and 408. A selection between any of link controllers may be made based on the type of media connected to the USB-C connector, and/or based on a detected signal quality affecting signals received from the link.

For example, a user-connected external device, such as a monitor or other mobile device, may operate in a default mode to transfer data to the computing device 400 via the USB-C connector 410 in accordance with one or more interface protocols. The media/channel quality detection circuit 426 may determine the supported link protocol(s) from the externally-connected device, and automatically select one from the available link controllers that matches. In other situations, a given matching protocol may be superceded by, for example, the Dual Duplex link protocol, where additional DSP processing may be desired to clean up a noisy channel that would not be cleaned up by a USB or Thunderbolt interface protocol that has little to no noise signal processing capability.

While the embodiments above utilize four differential signaling lanes, further embodiments may include fewer or more differential and/or single-ended serial lanes, depending on the desired protocol controller. For instance, six or more lanes may be employed for applications that may include, for example, a VirtualLink link interface protocol.

Those skilled in the art will appreciate that the embodiments described above enhance a computing device's useability by enabling wired link access via a variety of link protocols without requiring separate specialized connectors. This not only enhances link transfer data rates, when supported, but also minimizes the footprint associated with the link connector.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "I" attached to signal names indicates that the signal is an active low signal (i.e., the asserted state is a logic low state). A line over a signal name (e.g., '<signal name>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An input/output (I/O) interface system for computing devices, comprising:
    an externally-engageable USB-C interface connector;
    a first I/O protocol controller circuit coupled to the USB-C interface connector via multiple bidirectional serial lanes, ones of the multiple bidirectional serial lanes having a first end coupled to the USB-C interface connector, each multiple bidirectional serial lane among the multiple bidirectional serial lanes configured to transfer a single serial stream of data in a simultaneously bidirectional manner;
    a second I/O protocol controller circuit coupled to the USB-C interface connector via multiple unidirectional serial lanes, ones of the multiple unidirectional serial lanes having a first unidirectional end coupled to the second I/O protocol controller circuit and a second unidirectional end opposite the first unidirectional end that is coupled to the USB-C interface connector, the ones of the unidirectional serial lanes for transferring a single serial stream of data in a unidirectional manner; and
    mode control circuitry to select between the first I/O protocol controller circuit and the second EO protocol controller circuit for data transfers with the USB-C interface connector based on a detected signaling media externally coupled to the USB-C interface connector.

2. The I/O interface system according to claim 1, wherein: the first I/O protocol controller circuit comprises a dual-duplex controller circuit; and
the second I/O protocol controller circuit comprises at least one from the group comprised of a USB-C controller circuit, a Thunderbolt controller circuit, and a VirtualLink controller circuit.

3. The I/O interface system according to claim 1, wherein: each of the multiple bidirectional serial lanes comprises a differential signaling path.

4. The I/O interface system according to claim 1, wherein: a same set of connections in the USB-C interface connector are utilized for coupling the first I/O protocol controller circuit and the second I/O protocol controller circuit to the USB-C interface connector.

5. The I/O interface system according to claim 1, wherein: the mode control circuitry selects between the first I/O protocol controller circuit and the second I/O protocol controller circuit for data transfers with the USB-C interface connector further based on a detected signal quality associated with the signaling media externally connected to the USB-C interface connector.

6. The I/O interface system according to claim 5, wherein: the detected signal quality comprises a signal-to-noise ratio (SNR).

7. The I/O interface system according to claim 1, wherein: the first I/O protocol controller circuit comprises an NBASE-T Ethernet controller circuit; and
the second I/O protocol controller circuit comprises at least one from the group comprised of a USB-C controller circuit, a Thunderbolt controller circuit, and a VirtualLink controller circuit.

8. An input/output (I/O) interface system for computing devices, comprising:
an externally-engageable USB-C interface connector;
a first I/O protocol controller circuit coupled to the USB-C interface connector via a first set of differential signal paths, ones of the first set of differential signal paths having a first end coupled to the first I/O protocol controller circuit and a second end opposite the first end that is coupled to the USB-C interface connector, the first I/O protocol controller including transceiver circuitry coupled to the ones of the first set of differential signal paths to transfer data over the ones of the first set of differential signal paths in a simultaneously bidirectional manner;
a second I/O protocol controller circuit coupled to the USB-C interface connector via a second set of differential signal paths, ones of the second set differential signal paths having a first end coupled to fee first I/O protocol controller circuit and a second end opposite the first end that is coupled to the USB-C interface connector, the second I/O protocol controller including transmit circuitry coupled to a first subset of the second set of differential signal paths and receive circuitry coupled to a second subset of the second set of differential signal paths, the transmit circuitry and receive circuitry to transfer data over the respective first and second subsets of the second set of differential signal paths in a unidirectional manner;
wherein in a first mode of operation, the first I/O protocol controller circuit is enabled and the second I/O protocol controller circuit is disabled; and
wherein in a second mode of operation, the first I/O protocol controller circuit is disabled and the second I/O protocol controller circuit is enabled.

9. The (I/O) interface system according to claim 8, wherein:
a selection between the first mode of operation or the second mode of operation is based on a detected signaling media externally connected to the USB-C interface connector.

10. The I/O interface system according to claim 8, wherein:
the first I/O protocol controller circuit comprises a dual-duplex controller circuit; and
the second I/O protocol controller circuit comprises at least one from the group comprised of a USB-C controller circuit, a Thunderbolt controller circuit, and a VirtualLink controller circuit.

11. The I/O interface system according to claim 8, wherein:
the first I/O protocol controller circuit comprises an NBASE-T Ethernet controller circuit; and
the second I/O protocol controller circuit comprises at least one from the group comprised of a USB-C controller circuit, a Thunderbolt controller circuit, and a VirtualLink controller circuit.

12. The I/O interface system according to claim 8, further comprising:
mode control circuitry to select between the first mode of operation and the second mode of operation for data transfers with the USB-C interface connector further based on a detected signal quality associated with the signaling media externally connected to the USB-C interface connector.

13. The I/O interface system according to claim 12, wherein:
the detected signal quality comprises a signal-to-noise ratio (SNR).

14. A method of operation in an interface system for a computing device, the method comprising:
providing a USB-C interface connector for data transfers between the computing device and a second device;
for a first mode of operation, transferring data over a first set of differential signal lanes, ones of the first set of differential signal lanes having a first end coupled to the first I/O protocol controller circuit and a second end opposite the first end that is coupled to the USB-C interface connector, the ones of the first set of differential serial lanes transferring a portion of the data in a simultaneous bidirectional manner;
for a second mode of operation, transferring data over second set of differential signal lanes, ones of the second set of differential signal lanes having a first end coupled to the second I/O protocol controller circuit and a second end opposite the first end that is coupled to the USB-C interface connector, the ones of the second set of differential signal lanes transferring a portion of the data in a unidirectional manner; and
selecting the first or second mode of operation based on detected signaling media externally coupled to the USB-C interface connector.

15. The method according to claim 14, wherein:
the first I/O protocol controller circuit comprises a dual-duplex controller circuit; and
the second I/O protocol controller circuit comprises at least one from the group comprised of a USB-C controller circuit, a Thunderbolt controller circuit, and a VirtualLink controller circuit.

16. The method according to claim 14, wherein:

the first I/O protocol controller circuit comprises an NBASE-T Ethernet controller circuit; and the second I/O protocol controller circuit comprises at least one from the group comprised of a USB-C controller circuit, a Thunderbolt controller circuit, and a VirtualLink controller circuit.

17. The method according to claim 14, wherein:

the selecting between the first mode of operation and the second mode of operation for data transfers with the USB-C interface connector is further based on a detected signal quality associated with the signaling media externally connected to the USB-C interface connector.

* * * * *